Dec. 14, 1954  G. L. FISK  2,696,907
TRACTION ROLL
Original Filed April 19, 1944  7 Sheets-Sheet 2
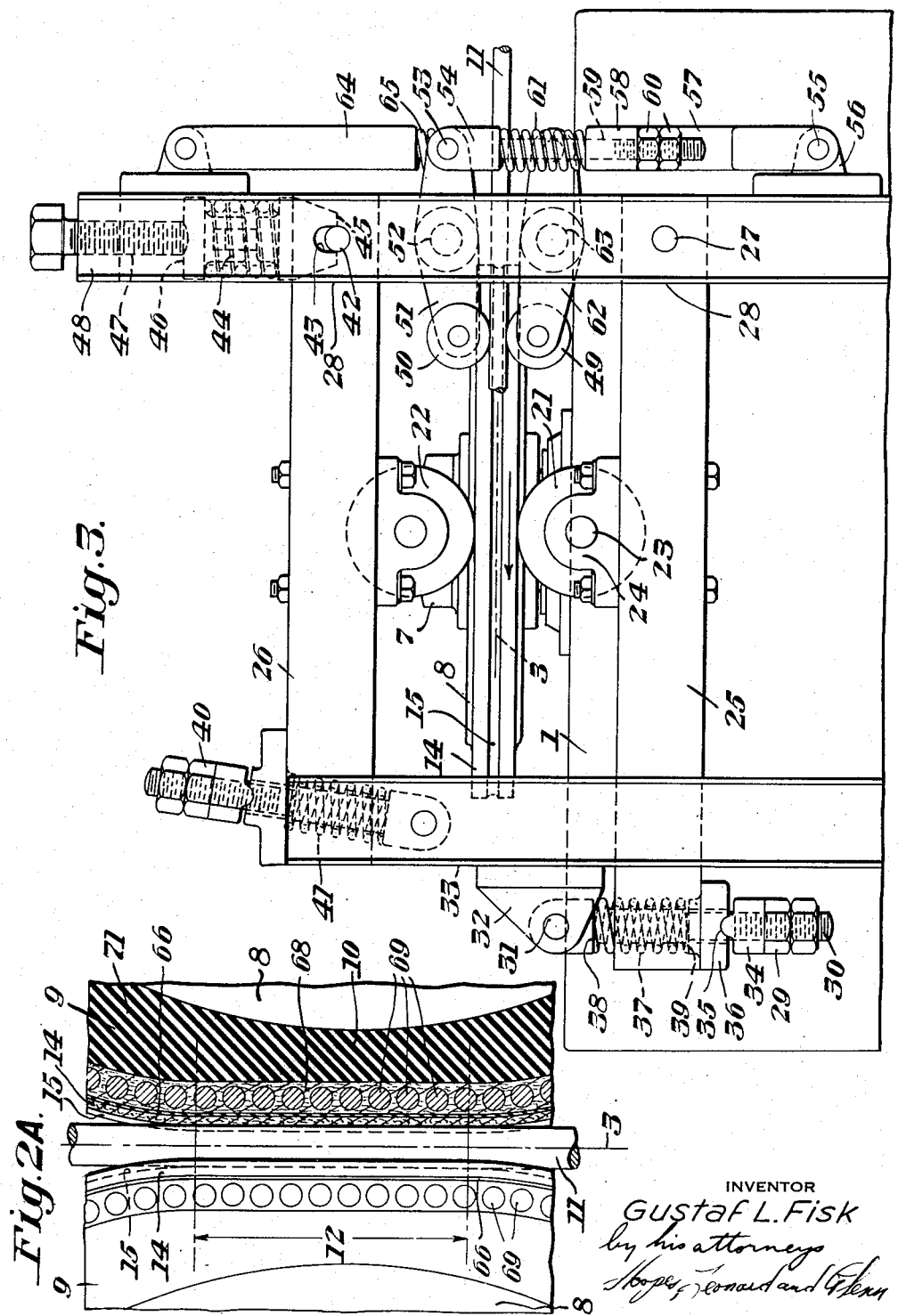
INVENTOR
Gustaf L. Fisk
by his attorneys Dec. 14, 1954 G. L. FISK 2,696,907
TRACTION ROLL
Original Filed April 19, 1944 7 Sheets-Sheet 3
Fig. 4.
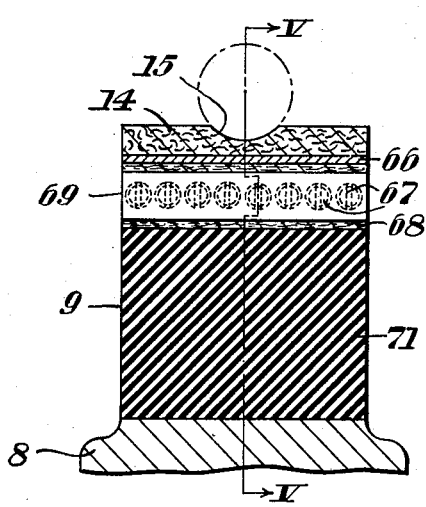
Fig. 5.
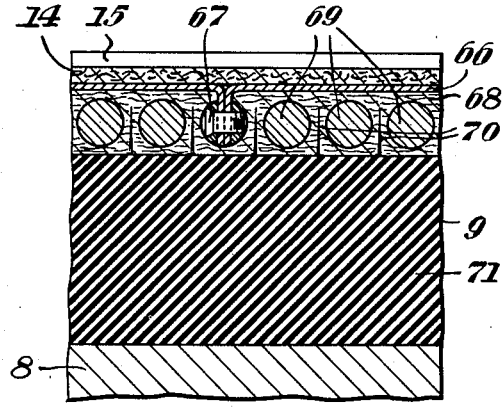
Fig. 6.
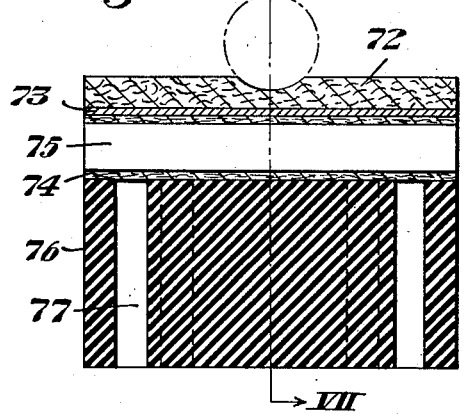
Fig. 7.
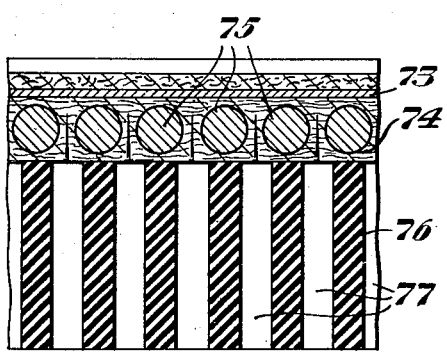
Fig. 8.
INVENTOR
Gustaf L. Fisk
by his attorneys Dec. 14, 1954      G. L. FISK      2,696,907
TRACTION ROLL
Original Filed April 19, 1944      7 Sheets-Sheet 4
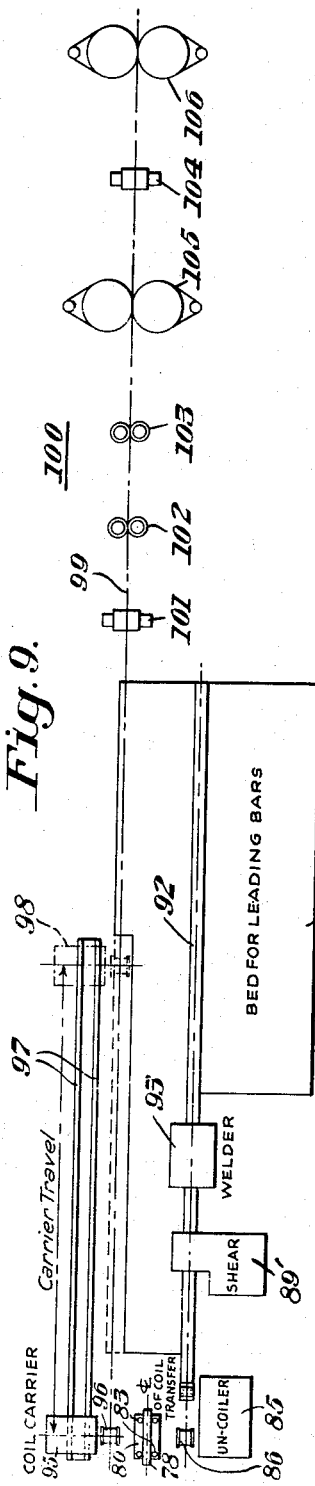
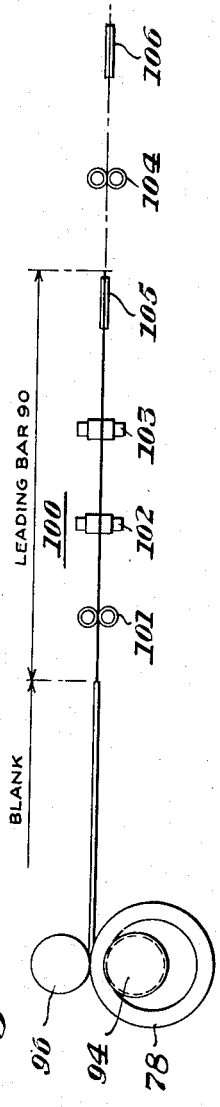
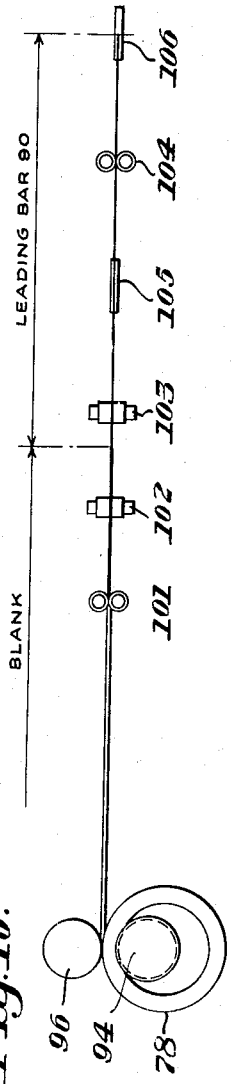
INVENTOR
Gustaf L. Fisk
by his attorneys

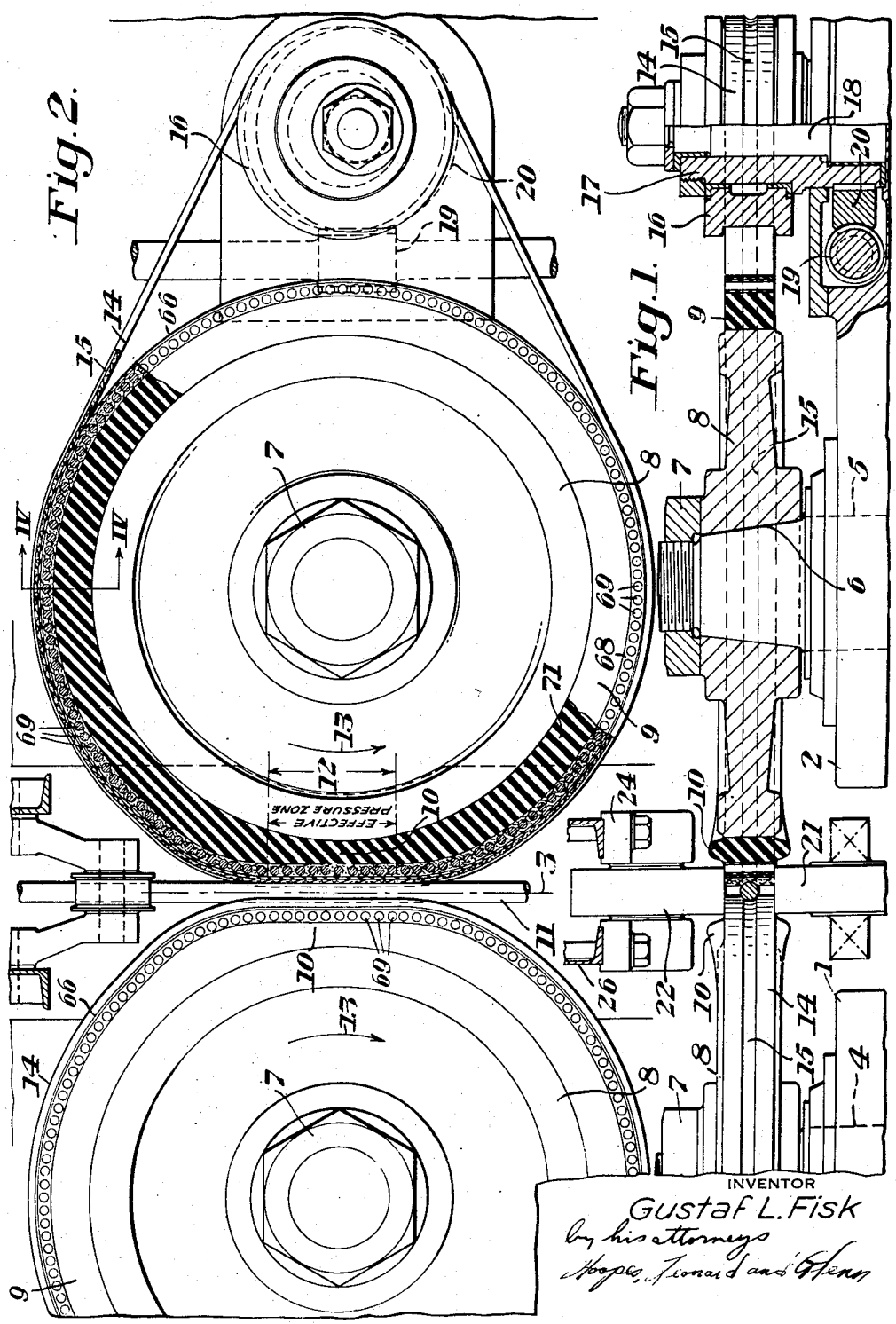

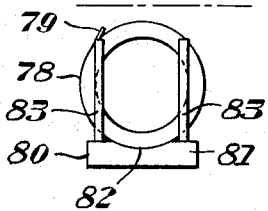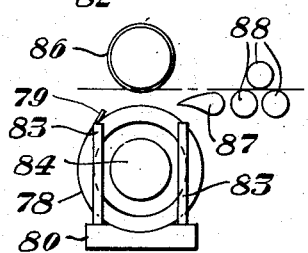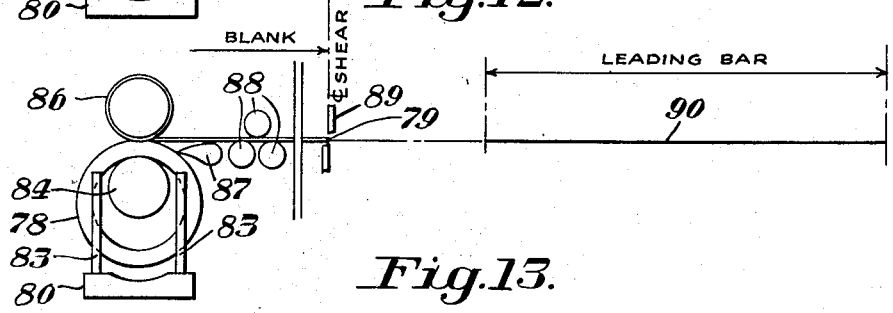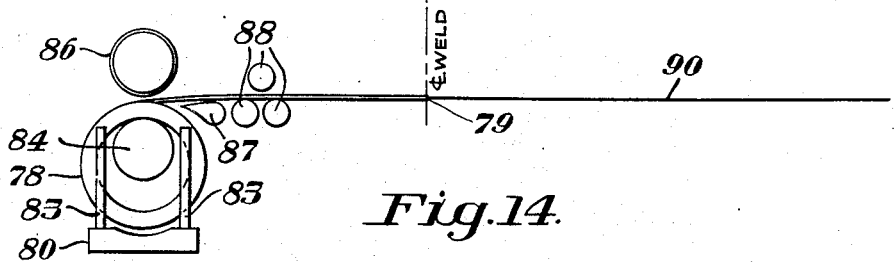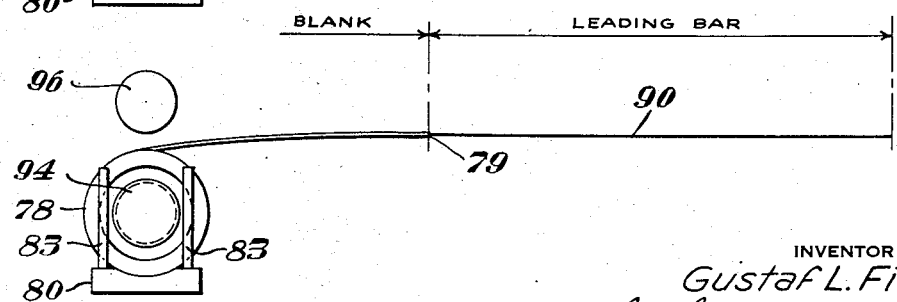

Dec. 14, 1954 G. L. FISK 2,696,907
TRACTION ROLL
Original Filed April 19, 1944 7 Sheets-Sheet 6
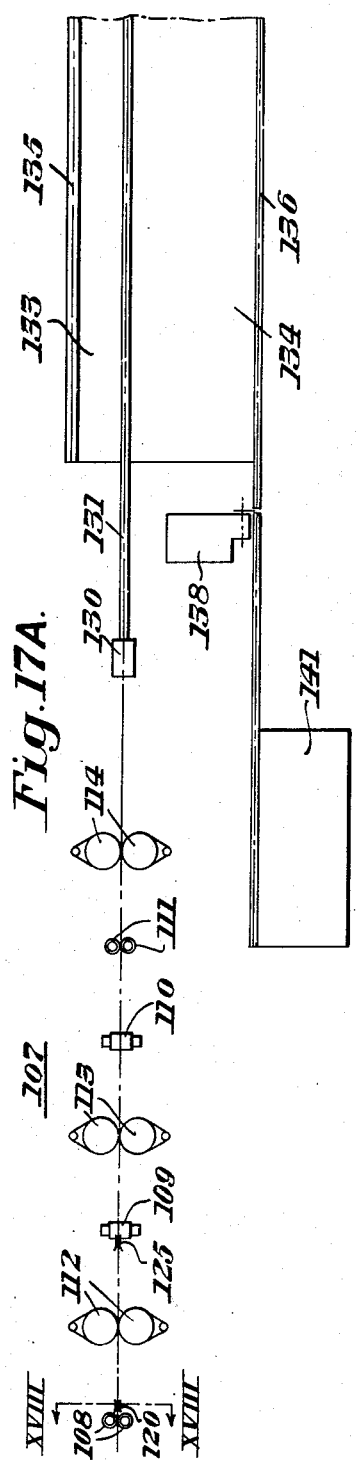
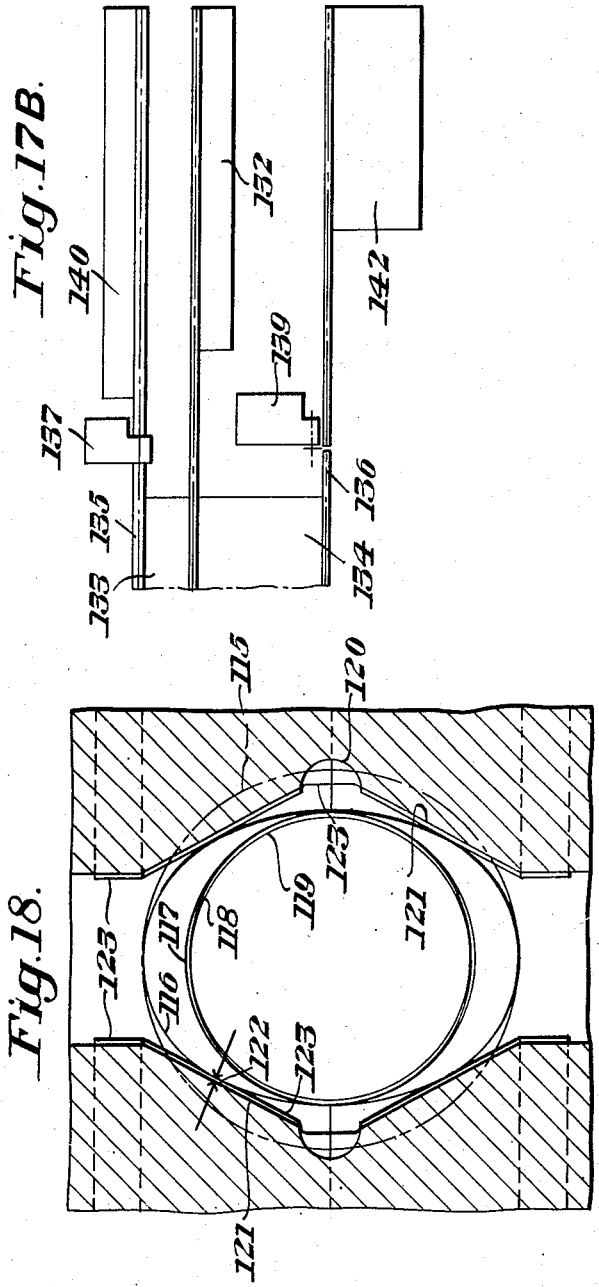
INVENTOR
Gustaf L. Fisk
by his attorneys Dec. 14, 1954

G. L. FISK 2,696,907

TRACTION ROLL

Original Filed April 19, 1944

INVENTOR
Gustaf L. Fisk
by his attorneys

United States Patent Office 2,696,907
Patented Dec. 14, 1954

2,696,907

TRACTION ROLL

Gustaf L. Fisk, New Fairfield, Conn.

Continuation of abandoned application Serial No. 531,724, April 19, 1944. This application May 15, 1951, Serial No. 226,467

1 Claim. (Cl. 203—310)

This invention relates to the rolling of metal bars of a great variety of sections, commonly known as merchant bars and shapes, whereby they may be finished to precise dimensions within close tolerances, and with improved physical properties. This application is a continuation of my copending application Serial No. 531,724, filed April 19, 1944, now abandoned.

In my Patent No. 2,369,730 I pointed out the difficulties of rolling metal bars to precise dimensions by the methods and apparatus previously utilized. In said patent, furthermore, I disclosed and claimed a method of rolling bars by passing hot-rolled blanks of cooling bed lengths, the sections of which have major and minor axes, through a plurality of stands of cold rolls, while applying tension to the bars between stands sufficient to prevent sidespread of the metal.

In my Patent No. 2,400,690 I disclosed and claimed a method of rolling bars, in a plurality of stands of cold rolls, from hot-rolled coiled blanks with major and minor axes, and under sufficient tension to deliver the finished bar in a straight length.

The methods disclosed in said patents are subject to some limitation, however, by the fact that a cold bar of a given height will not enter a pass in rolls of a given diameter as readily as a hot bar of the same size, unless the pass reduction, i. e. the draft, is very much reduced. Furthermore, the cold-rolling operation requires that the bar be lubricated to ease the work of deformation and to reduce the wear on the rolls. This requirement in turn still further reduces the maximum drafts permissible for ready entry of the bar into the cold-mill rolls. It will also be readily understood that if the drafts in the cold-mill stands succeeding the first are great enough barely to feed the bar through the rolls, there will be little or no excess pull available to exert the required tension on the bar between roll stands. The difficulty can be relieved by increasing the number of roll stands in the mill and, to some degree by increasing the diameters of the rolls, but these remedies would materially increase the cost of the mill. Larger roll diameters would also increase the necessary spacing of the roll stands, thus increasing the lengths at the ends of each bar which have to be rolled without benefit of tension, thus increasing the scrap loss.

The methods disclosed in said patents require blanks of special dimensions or with pronounced major and minor axes. Special passes are thus required in the hot mill to furnish such blanks for cold-rolling into rounds. This need for special blanks is naturally an economic drawback, compared to the possible use of ordinary commercial hot-rolled rounds as blanks. Another point in the cold-rolling of rounds from ovals with pronounced major and minor axes is the difference in the amount of cold working in the directions of the two axes, which may have detrimental effects on the physical properties of certain grades of products.

It is the object of the present invention to improve on the methods of said patents and particularly to provide the required tension by the aid of power-driven tension rolls effective to pinch the bar by an elastic grip over an area so large as not to cause deformation of the bar, but to maintain the bar under tension while the mill rolls reduce its section to the desired size. Such pinch rolls as are now available are useless for this purpose in that their rolls would furnish merely line contact with the bar. If the pressure of such pinch rolls on the bar be increased to attain the necessary contact area, they would cease to be merely pinch rolls and act to deform the bar, whereas my aim is to pull a finished bar from the mill rolls without further changing its shape or roughing its surface. To my knowledge there is no elastic material available for use in customary pinch rolls, which could bear directly on the bar and exert on it the required pressure, without deforming the bar.

Another object of my invention is to use the same power-driven tension rolls above referred to, in connection with leading bars attached to the blanks, as a means for pulling the blanks into the several roll passes; and thus to avoid the difficulties of bar entry above referred to.

Another object is to roll the entire blank to finished size, while progressively subjecting the bar from end to end to sufficient tension in the several roll passes, so as to practically eliminate scrap loss at the ends.

A further object is to make the rolling process largely independent of the spacing of roll stands, to allow more freedom of mill design.

Another object is to use ordinary commercial hot-rolled rounds as blanks for cold-rolling. This is accomplished by a novel method of guiding the section delivered by the rolls to which the commercial round is fed for cold-rolling, so as to keep the bar from turning around its own axis during the cold rolling operation.

Still another object is to make feasible the rapid and economical cold-drawing of hot-rolled bars to precise dimensions and in cooling bed lengths, as a finishing operation, by aid of the power-driven tension rolls and leading bars, such as already referred to.

For a complete understanding of the invention and the novel features and advantages thereof, reference is made to the following detailed description and the accompanying drawings. The latter illustrate the power-driven tension rolls and diagrammatically the preferred practice of my invention as applied to coiled blanks, as well as cold-mill layouts and guiding equipment which I prefer to employ. In the drawings, Figure 1 is a view partly in elevation and partly in vertical section, showing my tension roll apparatus;

Figure 2 is a plan view with a portion in horizontal section and with parts omitted, of the apparatus shown in Figure 1;

Figure 2A is a partial section similar to Figure 2, to enlarged scale;

Figure 3 is a side elevation of the same apparatus, to reduced scale, with one vertical roll omitted;

Figure 4 is a partial section, on line IV—IV of Figure 2, showing the cross section of a tire and belt adapted to give the tension rolls an elastic grip on a round bar;

Figure 5 is a partial section on line V—V of Figure 4;

Figure 20:
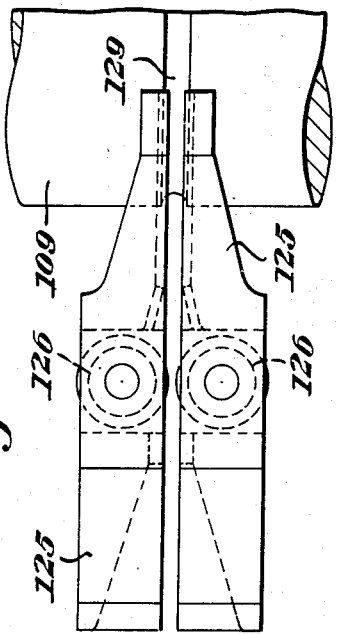
Figure 22:
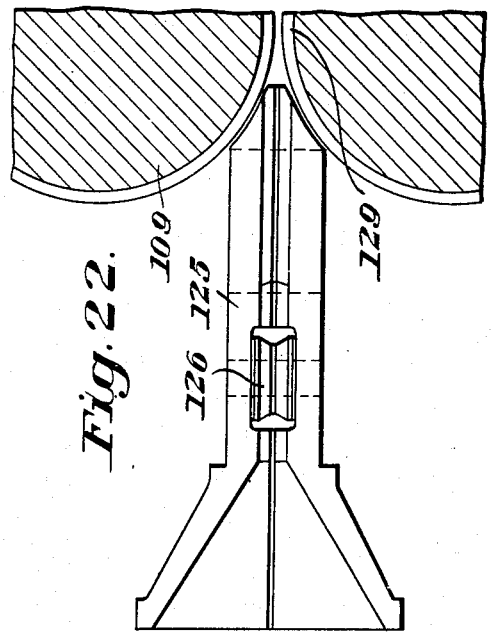
Figure 19:
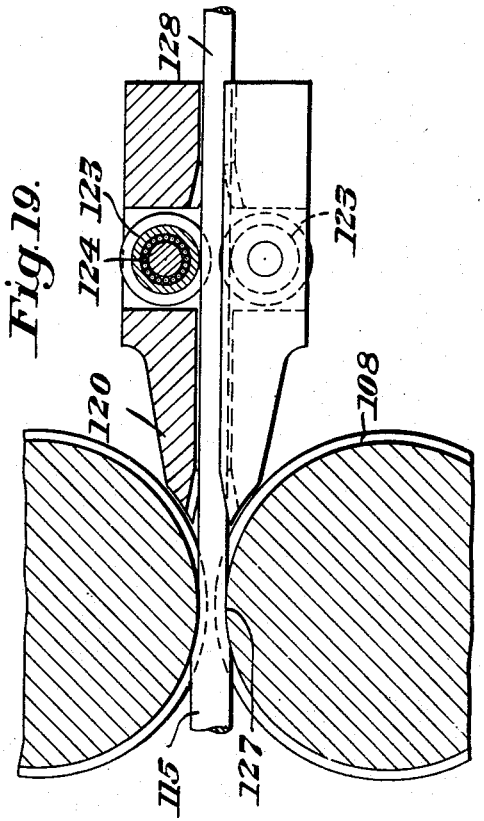
Figure 21:
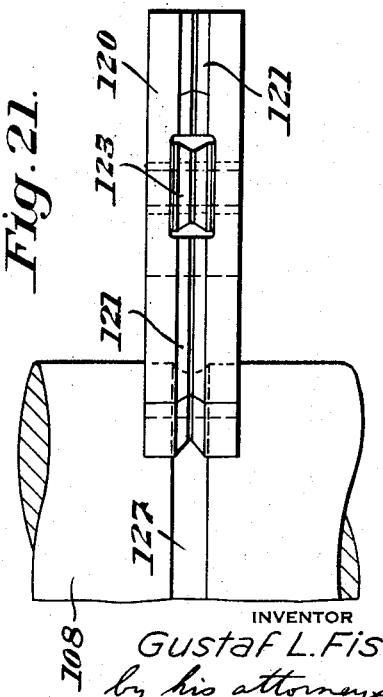

Figures 6 and 7, corresponding to Figures 4 and 5 respectively, show an alternate tire arrangement intended for use when greater bar tension is desired;

Figure 8 is an enlarged view of one of several clips, shown in the tires illustrated in Figures 5 and 7;

Figure 9 is a plan view of a cold mill equipped and arranged to practice my invention;

Figures 10 to 16 inclusive are side views, partly enlarged, showing a portion of the apparatus shown in Figure 9, to indicate diagrammatically the procedure in applying my invention to the cold-rolling of finished bars from coiled blanks;

Figures 17A and 17B together constitute a plan view of a modified form of cold mill proper, adapted to roll bars from commercial rounds as well as other sections and including a layout for the finishing end of the mill;

Figure 18 is a partial cross section of a guide taken on line XVIII—XVIII of Figure 17A, with the corresponding section of commercial round and with the sections produced in the several roll passes in the cold mill superimposed;

Figures 19 and 20 are plan views showing respectively the delivery guide of the first roll stand and the entry guide of the second roll stand of the mill shown in Figure 17A; and Figures 21 and 22 are elevations respectively of the guides shown in Figures 19 and 20.

Referring in detail to the drawings and for the present to Figures 1 through 3, a stand of tension rolls such as I have in mind is preferably made like a vertical edging mill of the over-hung roll type, extensively used in the industry for the edging of flat products, except that I use different means in place of the usual edging rolls, as will now be explained. The housings 1 and 2 of such an edging mill are individually adjustable in horizontal direction, towards or from a pass line 3, and carry power-driven vertical spindles 4 and 5 which project above the housings 1 and 2 and are provided with tapered ends 6 and nuts 7, or other suitable means, for the mounting of the edging rolls. Instead of ordinary rigid edging rolls, however, I employ rigid roll centers 8 on which are mounted flexible tires 9 of special construction, later to be explained. The tires 9 are adapted to form as indicated at 10, when the housings 1 and 2 are moved to the proper positions to bring pressure to bear on a bar 11 subject to tension. In this manner the effective pressure on bar 11 is distributed over a substantial distance 12. The tires 9 revolve with the roll centers 8 on the spindles 4 and 5 in the directions indicated by arrows 13 and in turn act as drive pulleys for belts 14 of leather or the like, which have grooves 15 to fit the particular size and shape of bar 11. Since the groove 15 is shaped to contact a large portion of the contour of the bar 11, this contact multiplied by distance 12 insures a large effective area for the exertion of the pressure required to carry the loads applied to the bar 11 through the travelling belts 14.

If the coefficient of friction between an oily bar 11 and the leather belt 14 be taken at .15, then a total load of 15,000 lbs. exerted on each side of the bar 11, by adjusting the housings 1 and 2 in the manner already described, would make it feasible to cause a pull of 4500 lbs. on bar 11 by rotation of the power-driven spindles 4 and 5 to drive the belts 14. With tires 9 of suitable material and an outside diameter of four feet, the effective pressure area above referred to, in case of a 3/4" bar, would be approximately 5 square inches for each belt. For the above total load of 15,000 lbs., therefore, the average unit load on such a bar would be in the neighborhood of 3000 lbs. per square inch. These figures serve to illustrate that a metal bar 11 can be subjected to considerable pull by a single stand of tension rolls, without in any way deforming the bar, which ordinarily would have an elastic limit many times that of the unit pressure to which it would be subjected by the tension rolls. Furthermore, if the tension applied be controlled so as not to exceed the frictional resistance between the bar and the belts, there should be no slippage and consequently no scuffing of the bar surface.

To steer the belts 14 and keep them from slipping on the tires 9, they are engaged by idler pulleys 16, journaled on eccentrics 17 which turn on pins 18, the latter being rigidly secured to housings 1 and 2. By aid of worms 19, mounted in housings 1 and 2 meeting with worm wheels 20 keyed to eccentrics 17, the tension in belts 14 can be adjusted. By turning the worms 19 and thus the eccentrics 17 a sufficient amount, the belts 14 can readily be released for removal and replacement by belts with other grooves 15, when changing the size or shape of the bar product.

To properly steer the belts 14 where they contact the bar 11, they and the tires 9 are supported in the vertical direction by rollers 21 and 22 mounted in journals 23 of bearings 24 on adjustable beams 25 and 26. The beam 25 is pivoted at 27 to a stationary frame 28 and the roller 21 is adjustable up or down by turning a nut 29 on a bolt 30, pivoted at 31 to a member 32 of a stationary frame 33. A yoke 34, supported on nut 29, bears at 35 on a member 36 of beam 25, and a spring 37 bearing on a shoulder 38 of bolt 30 and a shoulder 39 of member 36, serves to lower the beam 25 and the roller 21 to the position controlled by nut 29. By the same principle, a nut 40 and spring 41 control the position of the roller 22, by turning beam 26 on a pivot 42 in the stationary frame 28. The pivot 42, however, is allowed movement in a slot 43 of frame 28, the movement being controlled by the pressure of a spring 44, which bears on member 45 in contact with pivot 42. The spring 44 also bears on a movable member 46, supported by a screw 47 in a threaded member 48 of frame 28. The maximum load exerted on the belts 14 and tires 9 by the roller 22 is thus limited by the pressure of spring 44 irrespective of any ordinary adjustment of nut 40, and the pressure of spring 44 is controlled by screw 47.

The stationary frames 28 and 33 are located between the housings 1 and 2 and clear the latter in their most advanced position with respect to the pass line 3. This is readily accomplished since the diameter of the tires 9 is much greater than the roll diameter of any ordinary edging mill.

In changing the size or shape of product handled, the belts can quickly be released for removal and exchange. By loosening nuts 29 and 40 the rollers 21 and 22 are moved to release the belts 14 and tires 9. The housings 1 and 2 can then be moved away from the pass line 3 until the belts 14 clear the rollers 21 and 22 and their bearings 24. By then turning the worms 19 in the manner already explained the belts are made free for removal and exchange.

It is important that the bar 11 be guided accurately in the vertical direction into the pass formed by grooves 15. To this end an adjustable roller guide, formed by rollers 49 and 50, is placed close to the entry side of the pass. Roller 50 is carried by a rocker arm 51 supported by a pin at 52 on the stationary frame 28, and pivoted at 53 to a link 54 which in turn is pivoted at 55 to a member 56 of the frame. Each link 54 includes a bar 57 having a sleeve 58 formed at the end thereof, and a rod 59 having a clevis at the upper end by which it is pivoted at 53 to the rocker arm 51. The lower end of the rod 59 passes through the sleeve 58 on the bar 57 and is threaded to receive nuts 60. A compression spring 61 is disposed on the rod 59 between the clevis end thereof and the sleeve 58. By adjustment of nuts 60 the spring is put under compression and the roller 50 is brought to guiding position and supported by spring pressure, so as not to mar or work the surface of bar 11. The roller 49 is supported in a similar manner by rocker arm 62, pin 63, link 64 and spring 65.

The belts 14 are made of leather or other suitable material to obtain the required friction between them and bar 11, and also to attain reasonable belt life. In selecting the belt material, consideration must be given to oil, grease, or other lubricant which is bound to remain on the bars 11 as they emerge from a cold mill.

A preferred arrangement of tires 9 will now be described with reference to Figures 1 to 5 inclusive. Each tire has a tread ring 66 of spring steel. It may conveniently be made from a piece of steel belting bent to a circle and with the ends fastened together by a series of screws 67, in the manner indicated in Figure 5. Immediately inside the tread ring 66 is a layer of fabric 68 impregnated with rubber and in which a series of pins 69 of spring steel are embedded. The fabric 68 is cut between pins 69, to allow the steel clips 70 to be inserted. Such a clip is shown in detail in Figure 8. The balance of the tire 9 consists of a rubber cushion 71, which fills the space between the fabric 68 and the rim of the roll center 8. The inner surface of tread ring 66, the cylindrical surfaces of pins 69, the exterior surfaces of clips 70, and the rim of roll center 8 where it contacts rubber cushion 71, are subjected to brass plating or other suitable treatment, to allow the rubber to be securely bonded to all of these surfaces. The whole tire is then vulcanized while in position on the rim of the roll center 8. For this purpose the roll centers 8 are preferably made with demountable rims although, for the sake of simplicity, I have shown the rims in one piece with roll centers 8.

The tread ring 66 acts as a pulley for belt 14. It and the fabric 68 serve to retain the rubber cushion 71 within fixed limits, controlled by their own flexibility, under the longitudinal stresses (shear) exerted on the rubber of cushion 71 when the belts 14 are caused to pull on a bar 11 by revolving the spindles 4 and 5. The shear load applied to the rubber cushion 71 in the effective pressure zone 12 is thus distributed over a large area along the circumference of the cushion. The transverse load put on the cushion 71 in the pressure zone 12 by the roll centers 8, causes it to deflect as indicated at 10 and to transmit the load to fabric 68. The reaction of bar 11 to this load is distributed by belt 14, tread ring 66 and fabric 68, but principally by aid of pins 69, to make the full width of the cushion 71 effective to carry the reaction of bar 11. The purpose of clips 70 is to give the necessary flexibility to fabric 68, to allow the curved fabric to travel in a straight line through the effective pressure zone 12, without tearing.

Figures 6 and 7 show an alternate to tire 9, suited for greater loads and correspondingly greater pull on bars 11. In this case a belt 72, tread ring 73, fabric 74 and pins 75 distribute the working loads over a wider rubber cushion 76. The depth of rubber cushion 76 is the same as that of cushion 71 and is limited by manufacturing considerations, but holes 77 are provided, the number and size of which largely control the deflection of the cushion 76 under the working loads.

Having described a stand of tension rolls as shown in Figures 1 through 8, I shall now explain its application and use in conjunction with cold mills. The mill layout shown in Figure 9 is adapted for rolling from coiled blanks by the method specified in my Patent No. 2,400,690, above referred to, but extra tension is therein provided for by the addition of two stands of tension rolls. These tension rolls in combination with other provisions also facilitate entry of the bars into the roll passes and allow the blanks to be rolled to finished size under tension, from end to end, as will now be explained with reference to Figures 9 through 16.

Coiled blanks 78 with projecting ends 79 may be handled by any suitable means. As an example, a jib crane may be used to place the coil 78 in coil transfer 80 (Figures 9 and 10). The coil transfer 80 comprises a movable platform 81 with a depression 82 adapted to support a coil 78, and equipped with vertical posts 83 to keep the coil from falling over. On this transfer the coil is moved in axial direction until the lower spindle 84 of an un-coiler 85 projects through its center (Figures 9 and 11). The spindle 84 is then raised to take the weight of the coil and also to press the coil 78 into contact with the upper spindle 86 of un-coiler 85. (Figure 12). In this position the coil 78 is lifted free of coil transfer 80 and the edge of scraper 87 rests on the outer coil surface. The coil 78 is next rotated by revolving the spindles 84 and 86 to cause the projecting end 79 of the coiled blank 78 to be deflected by scraper 87 into overhung straightening rolls 88. Continued rotation of the spindles 84 and 86 and rolls 88 brings the end 79 of the blank into position for a squaring cut by knives 89 of shear 89'.

This shear cut is in preparation for the welding of a leading bar 90, of the same shape but preferably slightly smaller than the finished bar to be rolled in the cold mill, onto the now un-coiled end 79 of the blank of coil 78. Leading bars 90 of appropriate length, with their ends squared for butt welding to the un-coiled ends of the blanks in coils 78, are stored on bed 91 (Figure 9). By shuffle bars or other suitable means, they are brought one by one, as required, onto roller table 92 for lengthwise transfer to welder 93. Here the end of a leading bar 90 meets the end 79 of a blank, un-coiled to the extent required by further rotation of spindles 84 and 86 and rolls 88 (Figures 12 and 13).

When the welding operation is completed, the pressure of lower spindle 84 is released and the upper roll of the overhung straightening rolls 88 is raised sufficiently to free the coil 78 and the un-coiled portion of the blank for broadside transfer, together with the leading bar 90, now attached thereto. The broadside transfer is effected by the coil transfer 80, and rope transfers or other suitable mechanisms for the un-coiled portion of the blank and the leading bar 90. By these means the coil 78 is moved in axial direction by posts 83 until it slips off the end of lower spindle 84 onto the platform 81, and the movement is then continued until the lower spindle 94 of a coil carrier 95 projects through the center of coil 78 (Figures 9 and 14). At the same time, leading bar 90 is brought into alignment with the pass line 99 of the cold mill indicated generally at 100.

Referring now to Figures 9, 14 and 15, the lower spindle 94 of coil carrier 95 is next raised to take the weight of the coil 78 and to press the coil into contact with the upper spindle 96, thus freeing the coil 78 from coil transfer 80 for travel with coil carrier 95 along track 97 until the coil carrier reaches position 98 shown in dotted lines in Figure 9. Figure 15 shows the coil 78 in corresponding position with respect to the cold mill 100. As the coil carrier 95 advances with coil 78 along track 97, the coil transfer 80 is free to receive another coil and repeat its cycle of operation.

Except for the addition of two stands of tension rolls 105 and 106, the cold mill 100, used as an illustration, is arranged like the mill shown in Figure 6 of my application 499,210 above referred to. The section of the blank and the passes in the cold mill rolls 101, 102, 103 and 104 may, as an example, be those illustrated in Figures 1 through 5 of the same application.

It will be noted that the travel of coil carrier 95 with coil 78, having a portion of its blank uncoiled and a leading bar 90 welded thereto, will cause the leading bar 90 to be pushed into the tension rolls 105, as the coil carrier 95 advances on track 97 to position 98. The section of the leading bar 90 being approximately that of the intended mill product, it runs free in the passes of the mill rolls but is gripped by the belts of the tension rolls 105, adjusted for position and speed of rotation to exert a definite pressure and a definite pull on the bars subject to mill reduction. The fact that the groove in these belts is made to fit the rolled section to emerge from the mill rolls 103, will reduce the contact area of the belts and increase their unit pressure on the leading bar 90, but the total load and pull on the leading bar will be but slightly reduced as compared to those on the bars subject to mill reduction.

The pull thus exerted on the leading bar 90 by tension rolls 105, serves to draw the blank of the coil 78 into the passes in mill rolls 101 and 102. At this stage of progress of the blank through the mill, the forward end of the leading bar 90 is about to be gripped by the belts of tension rolls 106, which are then in position to furnish the pull required for entry of the bar into mill rolls 103 and 104 (Figure 16). It will be readily recognized that the pull thus exerted by the tension rolls 105 and 106 on the leading bar 90 will serve to avoid the difficulties of bar entry, by pulling the bar into the roll passes and thus obviating the present limitations as to feasible pass reductions.

For a clear understanding of the action of the tension rolls on a bar in the mill, assume that the mill rolls are idlers journalled in anti-friction bearings. The pull exerted by a stand of tension rolls placed after the last set of mill rolls would then be balanced by the resistances offered by the several roll passes, and these resistances in turn would be governed by the respective drafts. If the pull is sufficient to overcome the total resistance of all the drafts, then the bar travels through the mill subject to tension, increasing for each succeeding draft to total the pull of the tension rolls at the last reduction. By substituting power-driven mill rolls and duly co-ordinating their speeds with that of the tension rolls, it is evident that the resistance of a roll pass to the pull of the tension rolls can be nullified, by making the mill rolls furnish all the energy required for the bar deformation in the pass. The pull of the tension rolls can thus be transmitted for use at the roll pass next preceding. Furthermore, the mill rolls may be controlled for speed so as to add a pull of their own to that of the tension rolls. It follows that the pull of the several tension rolls and mill rolls can be made cumulative in going back through the mill, as the section of the bar increases in area. In other words, the total available pulling capacity can be distributed as required over the various sections of the bar in the several roll passes of the mill by speed control of mill and tension rolls.

It will be evident, therefore, that the pull provided by the tension rolls is applicable to the entire length of bar in the mill rolls preceding the tension rolls, and the bar section in each roll pass can be subjected to their pull, from end to end of bar (if the leading bar be made of sufficient length).

Referring now to Figure 9 is may be reasoned that the tension available for the front end of the bar, while it travels through rolls 101 and 102, is limited by the pulling capacity of one stand of tension rolls 105, whereas two stands, 105 and 106, are available thereafter. This difference can of course be eliminated by making the leading bar 90 of sufficient length to reach tension rolls 106 before the blank enters mill rolls 101. The entire blank would then be treated exactly the same throughout its length except for a short distance at its rear end. While worked upon in rolls 102 for instance the bar is subject to back tension from rolls 101. After the end of the bar leaves the rolls 101, this back tension ceases and the process is repeated when the rear end of the bar leaves the succeeding sets of rolls 102 and 103. With sufficient tension provided for the bar sections in the several roll passes, however, this lack of back tension will merely increase the work of deformation supplied by the mill rolls, but will not perceptibly affect the accuracy of the mill product.

In any event, I have entirely eliminated the source of scrap loss at the front end of the bar and greatly reduced the likelihood of scrap loss at the rear end, by providing means for exerting the desired pull on the bar section in each roll pass, in working the bar in the mill, from end to end.

After completing the rolling of a bar, the leading bar 90 is sheared therefrom. The leading bars 90 are used repeatedly, and a suitable storage space should be provided in the mill building to house sufficient numbers of such bars of the various sections required for the several products of the mill. A shear for squaring the ends of the bars may conveniently be located in this storage, or it may be placed in the line of roller table 92, between the bed 91 and welder 93 (Figure 9).

An alternate layout to cold mill 100 is indicated generally in plan view at 107 in Figures 17A and 17B. It has a set of vertical mill rolls 108, followed by two sets of horizontal mill rolls 109 and 110, and a set of vertical finishing rolls 111. Tension rolls 112, 113 and 114, of the type already described, are placed after mill rolls 108, 109 and 111. This is a preferred layout for the cold-rolling of precision rounds from hot-rolled commercial rounds. Figure 18 shows the size of the commercial round 115 in relation to bar sections 116, 117, 118 and 119, selected to illustrate the invention, and produced successively in the passes of the mill rolls.

Referring now to Figures 17A through 22, delivery guides 120, preferably held in position by customary guide box and rest bar, the latter secured to the mill housings, are provided on the delivery side of rolls 108. They are adjustable in any conventional manner to bring the guiding surfaces 121 to position where a small clearance 122 is provided for the oval section 116 emerging from pass 127 in rolls 108. The clearance 122 can be almost a sliding fit, since the bar is cold and oily, but I prefer to make it somewhat larger and provide idler rollers 123 for the accurate guiding of section 116. Guide friction can thus be reduced to a minimum, by mounting the rollers 123 on roller bearings 124, and possible guide scratching of the bar can be avoided.

Entry guides 125, similarly held in place and adjusted on the entry side of mill rolls 109, and idler rollers 126, provide the same clearance for a bar 128 of oval section 116 as it approaches the pass 129 in mill rolls 109.

Any ordinary hot-rolled commercial round may be used as a blank in cold-rolling precision rounds of smaller size. If in coil form, it is entered in the cold mill in the same manner as already described for coiled blanks with major and minor axes and as illustrated in Figures 9 through 16. The leading bars should preferably be of length to reach the tension rolls 114 before the ends of the commercial rounds reach the mill rolls 108.

As the leading bar, butt-welded to the uncoiled end of the commercial round, enters the mill 107, it passes freely through the mill rolls 108, 109, 110 and 111 and through the guides 120 and 125, but is gripped by tension rolls 112, 113 and 114. As the commercial round is pulled into pass 127 in mill rolls 108, it has a tendency to turn around its own axis to accommodate itself to the path of least resistance, due to the fact that the section is not a true round. A 1″ commercial round, for example, may be as much as .013″ out-of-round at any given point along its length, causing a turning moment on the bar as it travels into the pass 127.

This turning moment will be resisted by the leading bar, firmly held against rotation by the elastic grips of tension rolls 112, 113 and 114, while the end of bar 128 of oval section 116, rolled from the commercial round 115 in mill rolls 108, advances through delivery guides 120 to engagement with a groove, shaped to fit the oval 116, in the belts of tension rolls 112. The continued pull of tension rolls 113 and 114 on the leading bar serves to properly steer the bar 128 of oval section 116 into entry guides 125 and the pass 129 in mill rolls 109. The preferably circular section 117 emerging from mill rolls 109, is pulled by the leading bar into its groove in the belts of tension rolls 113 and entered into the mill rolls 110, shaped to produce oval section 118. This section in turn is entered by the leading bar into mill rolls 111 for rolling to a finished round 119.

The functions of the leading bar are now completed and the commercial round 115 is entered through the mill. In the meantime the guides 120 and 125 have taken over the duty of keeping the bar from rotating around its own axis. They control the position of oval 116 and thus resist the turning moment on commercial round 115. By virtue of the stiffness of the cold bar, they also keep it from turning in any of the several passes of mill 107. Another purpose of guides 120 is to control the position of oval 116 close to the pass 127, before any tendency of the bar to turn has a chance to develop. The guides 125 also control the position of oval 116 close to pass 129 for accurate entry.

The tension rolls alone, with their grips on the leading bars and the bars being rolled, may be sufficient to properly guide the bars being rolled from commercial rounds, so that guides 120 and 125 will not be needed, but I prefer to depend on such guides.

The use of tension rolls and leading bars to enter the blanks through the cold mill greatly facilitates the problem of accurately guiding the bar, and thus allows the stands of mill rolls to be placed further apart than in case of my copending applications above referred to. Since the causes of scrap loss at the ends of each bar have also been eliminated or greatly reduced, as already explained, the stand centers may now be selected with more consideration to practical mill design.

Having described my invention as applied to cold-rolling of rounds from coiled blanks with major and minor axes in mill 100, and from coils of commercial rounds in mill 107, I will refer briefly to a layout shown in Figures 17A and 17B suited for handling the products of either. Emerging from the cold mill, the leading bars are cut from the mill product by flying shear 130 and are conveyed by run-out table 131 to cradle 132. The rolled product may be divided by the same flying shear 130 into multiples of commercial lengths, and delivered by run-out table 131 and transfers 133 and 134 to tables 135 and 136, for division into final lengths by shear 137, saws 138 and 139, or other suitable cutting apparatus. The finished lengths are collected in a cradle 140 or on beds 141 and 142 respectively, for removal by an overhead crane.

In case of a relatively small order for bars of a given section, the total number of leading bars needed to fill the order may be placed on bed 91, later recovered from cradle 132 (Figure 17B), and returned to the storage space above referred to, for use on another occasion. The handling of the leading bars is preferably done by overhead crane.

In case of a large order for bars of a given size, there may not be enough leading bars on hand, and the same set of such bars may be used repeatedly until the order is completed.

So far, I have referred particularly to cold rolling from coiled blanks or coiled commercial rounds. It will be evident, however, that mills 100 and 107 and the layout shown in Figures 17A and 17B for handling the mill product, are equally well suited for straight lengths of such blanks and rounds. The layout ahead of the cold mill, shown in Figure 9, can readily be modified to allow for welding of leading bars to the ends of straight blanks or straight commercial rounds, and for feeding the butt-welded lengths to the mill. The proceedings for bar entry, rolling and guiding, remain the same as those already described with reference to mills 100 and 107. In this connection it will be noted that blanks with major and minor axes are entered in position to guide themselves through the mill along the path of least resistance.

Whereas I have described my new method and apparatus with particular reference to cold-rolling of accurate rounds, one of the more difficult sections to produce, it will be evident that they are adaptable for precision cold-rolling of other shapes, involving in some cases merely a change in the shape of the roll passes in the mill and the grooves in the belts of the tension rolls. In other cases it may be necessary to use tension rolls with horizontal spindles or to modify the tire design, to meet the requirements of different shapes.

My tension rolls may also be used in connection with leading bars to cold-draw hot-rolled straight bars through dies (or idler rollers), as a sizing operation, for great accuracy. For this purpose the bars would be hot-rolled to a size somewhat larger than the finished bar required. By butt-welding a leading bar to the hot-rolled bar and feeding the leading bar through a die, such as is now used for cold drawing (or through idler rollers), until it is gripped by one or more sets of tension rolls, the hot-rolled bar can quickly be pulled into and through the die (or rollers), for sizing by cold drawing. The principal advantages of this scheme of cold drawing, are the speed and economy of operation as compared to draw-benches now in use. The bar can be caught on the fly in the tension rolls and successive bars can follow closely, without time loss for re-setting the pulling apparatus. Furthermore, great lengths can be drawn, unlimited as far as the tension rolls are concerned. Full cooling bed lengths can thus be used as compared to the relatively short lengths that can be accommodated in present draw benches. This in itself is an economic advantage, the importance of which needs no further explanation.

Although I have described certain preferred applications of my invention, its advantages may be realized in other ways within the scope of the appended claim.

I claim:

In a traction roll for advancing a bar being rolled, a metal roll center, a yielding belt tread trained therearound, a tire on said center including a series of metal members extending transversely of said tread and embedded in a cushion of yielding material, the metal members of said series progressively serving to distribute the applied load over said cushion to reduce the unit load on said cushion material in the zone of pressure application.

References Cited in the file of this patent

UNITED STATES PATENTS

| Number | Name | Date |
|---|---|---|
| 582,191 | Ellis | May 11, 1897 |
| 669,733 | Perry | Mar. 12, 1901 |
| 691,789 | Mann | Jan. 28, 1902 |
| 1,139,884 | Mellen | May 18, 1915 |
| 1,184,972 | Lloyd | May 30, 1916 |
| 1,238,002 | Coryell | Aug. 21, 1917 |
| 1,403,377 | Barclay | Jan. 10, 1922 |
| 1,618,515 | Coryell | Feb. 22, 1927 |
| 1,759,105 | Evans | May 20, 1930 |
| 1,776,775 | Biggert | Sept. 30, 1930 |
| 1,833,330 | Palmgren | Nov. 24, 1931 |
| 1,901,514 | Herman et al. | Mar. 14, 1933 |
| 1,904,885 | Seeley | Apr. 18, 1933 |
| 1,911,157 | Leech | Mar. 23, 1933 |
| 2,297,296 | Flintjer | Sept. 29, 1942 |
| 2,353,290 | Bennewitz | July 11, 1944 |
| 2,438,448 | Morton | Mar. 23, 1948 |

FOREIGN PATENTS

| Number | Country | Date |
|---|---|---|
| 398,039 | Great Britain | Sept. 7, 1933 |